Feb. 6, 1973   DE LACY F. FERRIS   3,714,777
PRESSURE DIFFERENTIAL LIMITER
Filed July 6, 1970

INVENTOR
DE LACY F. FERRIS

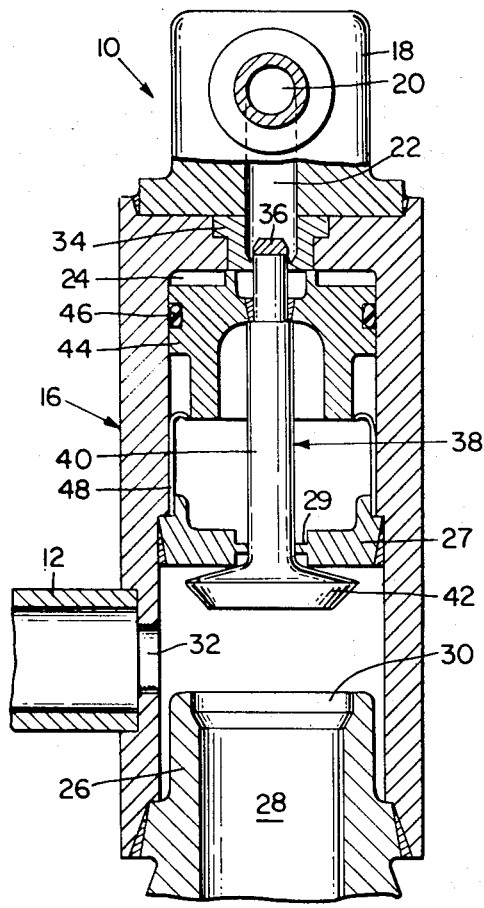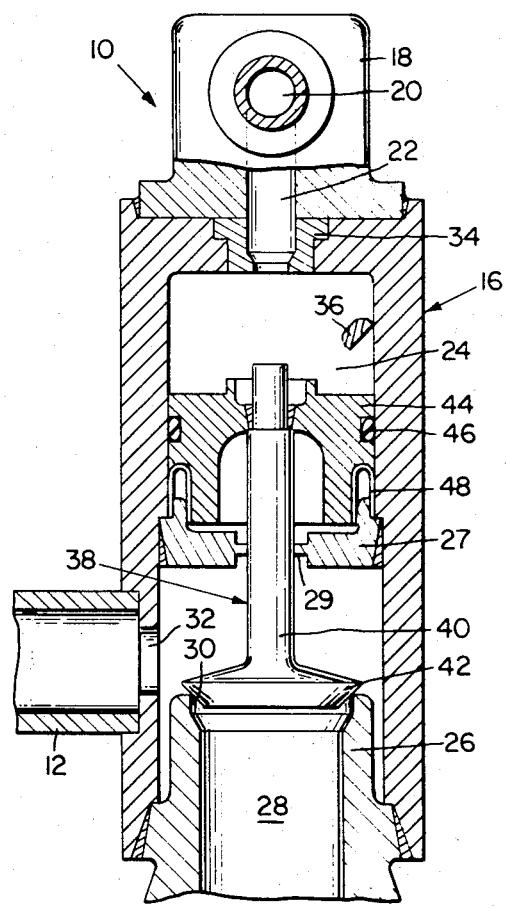

United States Patent Office 3,714,777
Patented Feb. 6, 1973

3,714,777
PRESSURE DIFFERENTIAL LIMITER
De Lacy F. Ferris, Van Nuys, Calif., assignor to the United States of America as represented by the Secretary of the Navy
Filed July 6, 1970, Ser. No. 56,021
Int. Cl. F02c 3/12
U.S. Cl. 60—39.48          4 Claims

ABSTRACT OF THE DISCLOSURE

A normally open pressure differential actuated oxidizer flow control valve is located in a liquid propellant system using a storage tank which employs a pressurized bladder to expell the oxident. This valve has an actuating piston responding to the increased expulsion gas-oxident pressure differential which occurs near completion of a missile firing. It is located in the oxidizer line and responds to such differential pressure increase to sever a shear disc and initially admit expulsion gas pressure to one side of the valve actuating piston. The other side is exposed to oxidizer pressure and, upon creation of sufficient pressure differential across the piston the valve closes to stop oxidizer flow.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the invention

This invention relates to liquid propellant flow control systems and particularly to pressure differential actuating valves useable in such systems.

(2) Description of the prior art

The positive expulsion concept for emptying liquid propellant tanks of missile propulsion systems utilizes a thin deformable metallic bladder which collapses from externally applied gas pressure to expel fluid such as oxident. However, rupture of the bladder can not be tolerated because of the possibility that the pressurizing gas may be rich with fuel and would react with the oxidizer and burn a missile employing the expulsion bladder concept. The present invention, while simple in structure and operation, effectively reduces the possibility of oxidizer bladder rupture.

SUMMARY OF THE INVENTION

To present excessive pressure differential across a deformable oxidizer expulsion bladder, a normally open pressure differential actuated flow control valve is positioned in the oxidizer line. Upon actuation by oxidizer pressure, a poppet stem positioned in the valve housing is punched through a weakened central portion of a shear diaphragm. This allows any excessive differential pressure thereafter occurring to act upon one side of a valve actuating piston and force the piston and attached valve members downwardly until the poppet head is positioned against a valve seat terminating oxidizer flow.

STATEMENT OF THE OBJECTS OF THE INVENTION

An object of this invention is to provide a novel pressure differential valve for use in controlling oxidizer flow in a liquid propelled missile fuel system.

Another object is to provide a normally open pressure differential actuated flow control valve in which oxidizer pressure is employed to control the initial admission of a valve closing pressure fluid and thereafter predetermined pressure differential conditions actuate the valve to the closed position.

Still another object is to provide a pressure differential valve for prevention of bladder rupture in a bladder type fuel expulsion system.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a change position view of the valve of FIG. 2 showing the valve stem punched through a shear diaphragm.

FIG. 4 is a sectional view of the valve of FIGS. 2 and 3 showing the poppet valve head closed against the poppet seat.

DESCRIPTION OF THE PREFERRED EMBODIMENT

Figure 1:
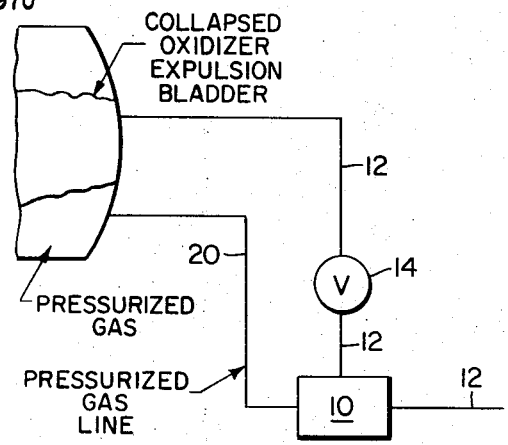
FIG. 1 is a diagram of the system in which the pressure differential valve is incorporated.
Figure 2:
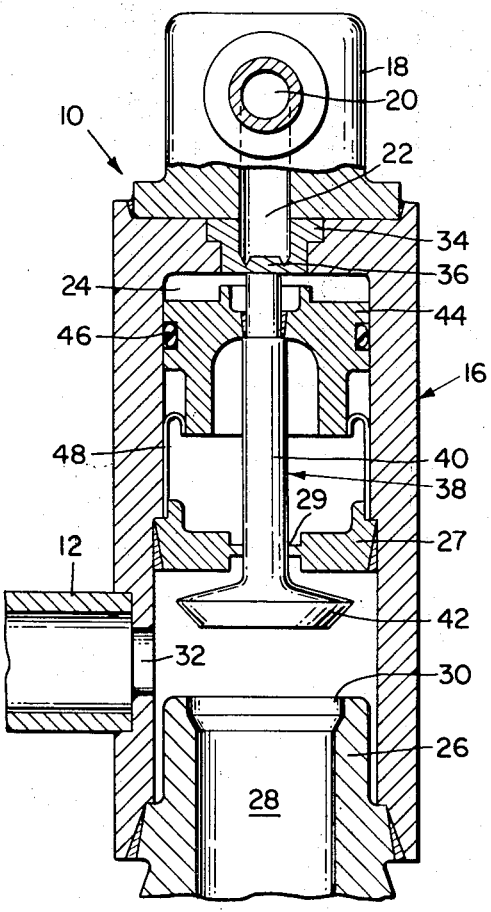
FIG. 2 is a vertical sectional view of a valve incorporating the invention and showing the valve in its normal open position.

The valve of the present invention prevents oxidizer retention bladder rupture by sealing off the oxidizer outlet line whenever the differential pressure between the bladder pressurization gas and the oxidizer fluid exceeds a certain amount. As shown normally open valve 10 is located in the oxidizer line 12 downstream of the usual isolation valve 14. The device comprises an elongate cylindrical valve housing 16, the upper end of which is closed by cap 18. An inlet passage 20 is formed in the cap for entrance of pressurization gas into a passage 22 and thence into the valve housing interior space 24 substantially as shown in the drawing.

It will be noted that an insert 34 with a central shear diaphragm portion 36 blocks the pressurization gas passage 22 until suitably opened as will be explained more fully hereinafter. A poppet valve member 38 is axially positioned in space 24 with the upper end of the poppet stem 40 being contiguous to and aligned with the central part of shear diaphragm 36. The stem 40 extends through orifice 29 of the poppet guide plate 27 where the stem is attached to poppet head 42.

A piston 44 is attached to the upper portion of poppet stem 40 and is sealed by O-ring 46 as well as rolling diaphragm 48. These two seals insure complete separation between the pressurization gas and the oxidizer.

An outlet conduit 26 with an oxidizer passage 28 is positioned at the outlet end of the housing 16. An annular poppet seat 30 is formed about the edge of outlet passage 28 and is adapted to receive poppet head 42 upon valve actuation. The oxidizer inlet opening 32 is located in one side of housing 16 closely adjacent to the poppet head 42 and communicates with oxidizer line 12.

In operation buildup of oxidizer pressure acts on the undersurface of piston 44 which forces the stem 40 upwardly until the shear diaphragm 36 is ruptured. Tank gas pressure is then sensed on the piston 44. Thereafter movement of poppet stem 40 and attached poppet head 42 into contact with the poppet seat 30 is controlled by the differential pressure operating upon opposite sides of piston 44, taking into consideration also the slight resistance of the rolling diaphragm seal 48.

It will be noted that the shear diaphragm functions to prevent premature actuation of the valve in the beginning when gas pressure increases but oxidizer pressure has not yet risen.

The differential pressure between the gas and oxidizer at which the poppet 38 is activated depends upon design considerations and the characteristics of the system in which the valve 10 is incorporated. In one missile propulsion system a differential pressure over 130 p.s.i. is required in order to force the poppet 38 closed against the resistance of the rolling diaphragm seal and terminate oxidizer flow.

Obviously many modifications and variations of the present invention are possible in the light of the above teachings. It is therefore to be understood that within the scope of the appended claims the invention may be practiced otherwise than as specifically described.

I claim:

1. In a liquid oxidizer flow control system wherein a tank contains a deformable oxidizer filled bladder which is subjected to pressurized gas in order to expel oxidizer therefrom, the combination of means for preventing a rupture of the bladder during certain phases of the oxidizer explusion comprising:

a valve housing forming a chamber and having an oxidizer outlet, and a gas inlet;

an oxidizer supply line leading from the oxidizer area within the bladder to the oxidizer inlet of said housing;

a bladder pressurization gas line leading from the tank area outside of said bladder to the gas inlet of said housing;

a shear diaphragm within said housing normally blocking admission of bladder pressurization gas into said chamber;

a valve member within said housing movable to close said oxidizer outlet;

said valve member including a shear diaphragm penetrating portion contiguous to said shear diaphragm;

and a piston movable within said chamber and associated with said valve member for imparting movement thereto, said piston having a gas side and an oxidizer side;

whereby a flow of oxidizer at greater than a predetermined pressure acting upon the oxidizer side of said piston causes valve member movement to shear said diaphragm and admit pressurization gas to the gas side of said piston so that the valve may thereafter move to a closed position upon the establishment of a predetermined pressure differential condition across said piston.

2. The invention defined in claim 1 wherein the valve member is of the poppet type having a head portion and a stem portion, the end of said stem portion acting upon said shear diaphragm to penetrate the same and admit bladder pressurization gas to the gas side of said piston.

3. The valve as defined in claim 1 wherein:

said piston is sealed against pressure leakage by an O-ring and a rolling diaphragm seal.

4. The valve as defined in claim 2 wherein an annular poppet seat is positioned around said fluid outlet against which the head portion of the poppet is positioned when moved by the pressure differential.

References Cited

UNITED STATES PATENTS

| | | | |
|---|---|---|---|
| 3,125,853 | 3/1964 | McKinnon | 60—39.48 |
| 3,213,614 | 10/1965 | Leslie et al. | 60—39.48 |
| 3,323,308 | 6/1967 | Greco | 60—39.48 |

SAMUEL FEINBERG, Primary Examiner

U.S. Cl. X.R.

222—95, 396